United States Patent
Yang

(10) Patent No.: US 6,801,569 B1
(45) Date of Patent: Oct. 5, 2004

(54) DIGITAL MATCHED FILTER BANK FOR OTHOGONAL SIGNAL SET

(75) Inventor: Gang Yang, Pikesville, MD (US)

(73) Assignee: Golden Bridge Technology Inc., West Long Branch, NJ (US)

( * ) Notice: Subject to any disclaimer, the term of this patent is extended or adjusted under 35 U.S.C. 154(b) by 810 days.

(21) Appl. No.: 09/598,470

(22) Filed: Jun. 22, 2000

(51) Int. Cl.$^7$ .............................................. H04L 27/06
(52) U.S. Cl. ....................... 375/152; 375/153; 375/143; 375/149; 375/343
(58) Field of Search ................................ 375/143, 149, 375/152, 153, 343; 342/357.06; 370/209, 441

(56) References Cited

U.S. PATENT DOCUMENTS

| | | | |
|---|---|---|---|
| 5,715,276 A | | 2/1998 | Tran et al. |
| 5,802,102 A | | 9/1998 | Davidovici |
| 5,894,494 A | | 4/1999 | Davidovici |
| 5,956,333 A | * | 9/1999 | Zhou et al. .................. 375/152 |
| 6,061,359 A | | 5/2000 | Schilling et al. |
| 6,366,626 B1 | * | 4/2002 | Boyd .......................... 375/343 |
| 6,567,483 B1 | * | 5/2003 | Dent et al. .................. 375/343 |

OTHER PUBLICATIONS

GBT Technology & Innovation—Common Packet Channel (CPCH) Nov. 23, 1999.
GBT Technology & Innovation—Matched Filter Technology Application to 3G—Dec. 3, 1999.
GBT Technology & Innovation—An Introduction to Fourth Generation (4G) Celluular Technology Dec. 3, 1999.
DRAFT—Wideband CDMA Acquisition System Effects on handset Power Consumption—Golden Bridge Technology, Inc. Dec. 9, 1999.

* cited by examiner

*Primary Examiner*—Stephen Chin
*Assistant Examiner*—Edith Chang
(74) *Attorney, Agent, or Firm*—McDermott Will & Emery LLP

(57) ABSTRACT

A spread-spectrum communication system utilizes spreading code sequences, which can be expressed as a matrix. The matrix of code sequences has or can be transformed to have a certain orthogonal relationship. In accord with the invention, a matched filter bank in a spread-spectrum receiver processes input signals that purport to contain the code matrix using two halves of an input stream matrix and only two of four possible quadrants of the code matrix as the reference inputs. Such processing produces two quadrants of a correlation signal matrix. It is then possible to determine the other two quadrants of the full correlation signal matrix from the known relationship with the two quadrants derived from the matching operations. The processing of only two of the quadrants of the signal matrix substantially reduces the number of computations and the amount of processor hardware needed to implement a matched filter bank to recognize the codes embedded in a received spread-spectrum signal.

21 Claims, 9 Drawing Sheets

DIGITAL MATCHED FILTER BANK FOR OTHOGONAL SIGNAL SET

FIELD OF THE INVENTION

The concepts involved in the present invention relate to spread-spectrum communications and particularly to application of matrix processing to a matched-filter, used for example to recognize chip-code sequences within a spread-spectrum signal.

BACKGROUND

Mobile communication is becoming increasingly popular, at much the same time that more and more customers are asking for ever higher data-rate services. Increasingly, development efforts are focusing on techniques for high-capacity communication of digital information over wireless links.

Spread-spectrum is a method of modulation, like FM, that spreads a data signal for transmission over a bandwidth, which substantially exceeds the data transfer rate. Spread-spectrum is now finding frequent application to wideband communication over wireless links. Direct sequence spread-spectrum involves modulating a data signal with a pseudo-random chip sequence. The spread-spectrum signal is transmitted as a radio wave over a communications media to the receiver. The receiver despreads the signal to recover the information data.

Receiving the spread spectrum communications therefore requires detection of one or more spreading chip-code sequences embedded in an incoming spread-spectrum signal as well as subsequent synchronization of the receiver to the detected chip-code sequence. Initial detection and phase synchronization of the spreading chip code sequence(s) in the receiver is commonly known as code acquisition. Although simple correlators have been used in the code acquisition for reception of spread-spectrum signals, faster and more effect techniques for code acquisition rely on matched filters.

A matched filter essentially matches an input signal to a reference chip-code sequence signal, by multiplying a set of N samples of the input signal with the reference signal, then summing the product terms to determine a value of correlation of the input signal to the reference signal. If the correlation value exceeds a threshold, then a decision circuit indicates that there is a match. A bank of matched filters may process the input in parallel, to determine the correlation to a plurality of codes. The reference code having the highest correlation with the input is selected as the match to the code contained in the received spread spectrum signal.

Although the matched filter is an effective technique for detecting a code sequence within a received spread-spectrum signal, implementation for detecting a number of possible codes may be quite hardware intensive. Particularly for relatively long chip code sequences, each of the matched filters in a bank of filters requires a large number of adders in the form of an extensive adder tree, to complete the computation of the correlation value for use in determining if there is a match to the reference chip-code sequence signal.

To appreciate the problem, it may be helpful to consider some examples. FIG. 1 shows an example of a matched filter bank 11 for detecting a plurality of 1 to N chip-code sequences. An analog to digital converter (not shown) digitizes a received spread-spectrum signal. The resulting input signal with K bits is sequentially input to a tapped delay line. The delay line essentially comprises N delay devices 13 with a tap before the first delay device, taps between the delay devices, and a tap after the last delay device as shown. Each matched filter 15 receives the same inputs, specifically the input signal as well as the delayed input from each output of a delay device 13 in the line. However, each filter receives a different chip-code sequence for use as a reference and therefore attempts to recognize a different code sequence within the bit stream derived from the received spread-spectrum signal.

Each filter 15 outputs a correlation value m(k). Because there are K bits in the input sample, each output m will include K+L bits, where L is the number of layers within the filters 15. Overall the filter bank 11 will produce a matrix of correlation values $m_1(k), m_2(k) \ldots m_{N-1}(k)$.

FIG. 2 is a block diagram useful in understanding the implementation of one of the matched filters 15. Specifically, the block diagram shows one L-layered structure for performing the matched filter function. The matched filter comprises a plurality of multipliers 17. The filter includes one such multiplier 17 for receiving each of the input bit sequences from the input and the taps between the delays 13 of the delay line. Assume for discussion purposes that each reference code comprises a sequence $S_{i,0} S_{i,1} \ldots S_{i,N} S_{0,N-1}$. The first code sequence, for example, would be $S_{0,0} S_{0,1} \ldots S_{0,N} S_{0,N-1}$. Each multiplier therefore receives a portion of reference code sequence $S_{i,0} S_{i,1} \ldots S_{i,N} S_{0,N-1}$ for multiplication with the respective delayed portion of the input bit stream r.

Assuming that a code bit may have a value of 1 or −1 (corresponding to 0, 1 in digital notation), each multiplication operation will have an output value of 1 if the input value and the reference value are the same (1x1 or −1x−1). Each multiplication operation will have an output value of −1 if the input value and the reference value are different (1x−1 or −1x1). To determine an overall correlation to the complete reference code, the outputs of the multipliers are summed in pairs, through layers of adders 19, 20, and 21. The last adder 21 outputs the total correlation value, which represents how closely the input bit stream matched the reference sequence. For a perfect match, for example, the output of the adder 21 would be N. If there is no match at all, the output of the adder 21 would be 0. However, in an implementation processing real received spread-spectrum signals, there will be some variable degree of matching.

Returning to FIG. 1, each matched filter will output a value m(k) representing the degree of correlation between the input and the respective reference chip-code sequence. A decision element, not shown compares the output of each matched filter 15 to a threshold and/or to the values from the other filters to determine the most likely match to one of the reference code sequences.

With this type of matched filter approach, assume for discussion that the input has K bits, and the orthogonal signal set is of 64 Walsh codes with any cover code of a length of 64. The receiver would require a bank having 64 matched filters. Each matched filter would have:

| | | |
|---|---|---|
| 32: | K | bit adders |
| 16: | K + 1 | bit adders |
| 8: | K + 2 | bit adders |
| 4: | K + 3 | bit adders |
| 2: | K + 4 | bit adders |
| 1: | K + 5 | bit adders |

Totally, there would 64(63K+57)=4032K+3,648 of bit addition operations. When K=4, the receiver would require (4,032(4)+3,648) of bit additions, that is to say 19,776 of bit additions. If K=8, then the receiver actually would require (4,032(8)+3,648) of bit additions, that is to say 35,904 of bit additions. Although these additions may be implemented in software, for spread-spectrum receivers, they are typically implemented as hardware in an ASIC. Each adder consumes space on the actual chip. Each adder increases the complexity of design and manufacture of the chip. Also, each adder requires additional power, which is a particularly scarce resource in a mobile wireless receiver.

Hence there is a clear need for a technique to reduce the computations and thus the amount of hardware needed to implement the matched filter bank in a spread-spectrum receiver.

SUMMARY OF THE INVENTION

Accordingly, a general objective of the invention is to achieve improved processing in a matched filter-bank, typically for use in a receiver for spread-spectrum signal processing, to enable accurate code detection with substantially reduced numbers of computations and thus with reduced requirements for hardware.

Another objective relates to use of matrix processing to allow code detection on a smaller portion of a code matrix, and thus on a reduced matrix of code elements. Assuming a known relationship of the detectable code elements to the other elements of the code matrix, it is possible to detect the more limited portion of the matrix and extrapolate to complete the matrix of detected signals.

The inventive concepts alleviate the above noted problems in spread-spectrum communications and achieve the stated objectives by using spreading codes having a known desired degree of orthogonal relationship or manipulating input signals and reference signals to conform to the desired relationship. The code relationship enables separate matching of portions of the input matrix to a selected subset of the reference code matrix. Manipulation of the resulting sub-matrices of correlation values enables determination of the overall correlations of the input to the full matrix of reference codes.

One aspect of the present invention therefore relates to a matched filter bank for processing spreading codes in a signal received from a spread-spectrum communication system. The matched filter bank utilizes two quadrant matrix matched filters. The first quadrant matrix matched filter receives a first half of an input bit stream, derived from the received spread-spectrum signal. The first quadrant matrix matched filter derives a first quarter matrix of correlation values, which represent the correlation of the first half of the input bit stream to a first quadrant of a matrix of reference codes related to the possible spreading codes utilized in the spread-spectrum communication system. In accord with the invention, the codes of the reference matrix exhibit at least a predetermined degree of orthogonality to other codes within the matrix. The second quadrant matrix matched filter similarly processes the second half-matrix of the input bit stream and a second quadrant of the matrix of reference codes to produce a second quarter matrix of correlation values.

It is understood that a matrix is an "orthogonal matrix" if every row is orthogonal to every other row. The inventive matched filter techniques may use an orthogonal reference matrix, however, the preferred embodiments work with any reference matrix wherein each row of the upper half of the matrix is orthogonal to the corresponding row of the lower half of the matrix.

The filter bank also includes a matrix computation system. This system manipulates the first quarter matrix of correlation values and the second quarter matrix of correlation values, to obtain a full matrix of correlation values representing correlation of the bit stream to the entire orthogonal matrix of reference codes.

In a preferred embodiment, the matrix computation system comprises a matrix adder and a matrix subtractor. The matrix adder adds the first and second quarter matrices of correlation values together, and the subtraction circuit subtracts the second quarter matrix of correlation values from the first quarter matrix of correlation values. The outputs of the matrix adder and the matrix subtractor together form the full matrix of correlation values.

In some cases, the actual spreading codes utilized in the spread-spectrum communication system have the desired orthogonal property, enabling use of a matrix of the actual spreading codes directly as the matrix of reference codes. In such a case, there is a one-to-one relationship between the spreading codes used in the spread-spectrum communication system and the codes making up the orthogonal reference matrix.

However, in some cases there is a different relationship between the spreading codes and the matrix of reference codes. If the spreading codes used in the spread-spectrum communication system are not sufficiently orthogonal or do not otherwise have the desired property, it is possible to determine a matrix relationship between the spreading codes and the desired matrix of reference codes. In such a case, the invention relies on matrix manipulation of the input bit stream and/or elements in the various quadrants of the matrix of spreading codes, to effectuate a conversion corresponding to a conversion of a matrix of the possible spreading codes to the matrix of reference codes having the desired property.

Aspects of the invention also include use of the inventive matched filter bank in a spread spectrum receiver. In such an implementation, the receiver includes an analog to digital converter for converting a received spread-spectrum signal to a digital bit stream comprising a matrix of input samples. The two quadrant matrix matched filters receive and process the separate halves of the input matrix, to produce the two quadrants of the matrix of correlation values and derive the overall correlation matrix therefrom. The receiver also includes a processor for receiving the full matrix of correlation values. The processor analyzes the values from that matrix to identify a code contained within the received spread-spectrum signal, by identifying one of the reference codes corresponding to the highest correlation value in the full matrix of correlation values.

Another aspect of the invention relates to a method of processing spreading code sequences in a signal received from a wireless spread-spectrum communication system. The method entails establishing an orthogonal matrix of reference code sequences. Each reference code sequence in the orthogonal matrix has a known relationship to one of the spreading code sequences that may be in the signal received from the wireless spread-spectrum communication system. A first one of four quadrants of the orthogonal matrix serves as a first quadrant reference matrix, and a second one of the four quadrants of the orthogonal matrix serves as a second quadrant reference matrix. The received signal is converted into a digital bit stream, and a predetermined number of samples from the digital bit stream are processed to form a matrix input, which is separated into a first half matrix and a second half matrix. The method involves two matched-filtering steps. The first such filtering step processes the first half matrix and the first quadrant reference matrix, to derive a first quarter matrix of correlation values. The second filtering step processes the second half matrix and the second quadrant reference matrix, to derive a second quarter matrix of correlation values. The methodology also entails processing the first and second quarter matrices of the correlation values, to obtain a full matrix of correlation values. The full matrix of correlation values represents correlation of the predetermined number of samples from the digital bit stream to the entire orthogonal matrix of reference code sequences.

The inventive matrix processing in the matched filter bank substantially reduces the complexity and amount of computation needed to derive the full set of correlation values. If the matching were done in a processor, this would reduce the number of overall calculations that the processor must perform. However, in a device for use in a mobile wireless receiver, the code matching function typically is executed by hardware. In this later case, the matrix processing in accord with the invention enables a substantial reduction in the necessary hardware.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

DETAILED DESCRIPTION OF THE PRESENTLY PREFERRED EMBODIMENTS

The present invention provides a solution for matching of spreading codes based on certain matrix relationships between orthogonal codes. Essentially, if a matrix of the spreading codes has or can be transformed to have a certain orthogonal relationship, it is possible to process input signals that purport to contain the code matrix by matched filtering two halves of an input stream matrix with only two of four possible quadrants of the code matrix as the reference inputs. Such processing produces two quadrants of a correlation signal matrix. It is then possible to determine the other two quadrants of the full correlation signal matrix from the known relationship with the two quadrants derived from the quadrant matching operations.

The processing of only two of the quadrants of the signal matrix substantially reduces the number of computations and the amount of processor hardware needed to implement a matched filter to recognize the codes embedded in a received spread-spectrum signal. The invention can save tremendously on the requirements of hardware, particularly for implementing the adder trees of the matched filter bank.

Figure 3:
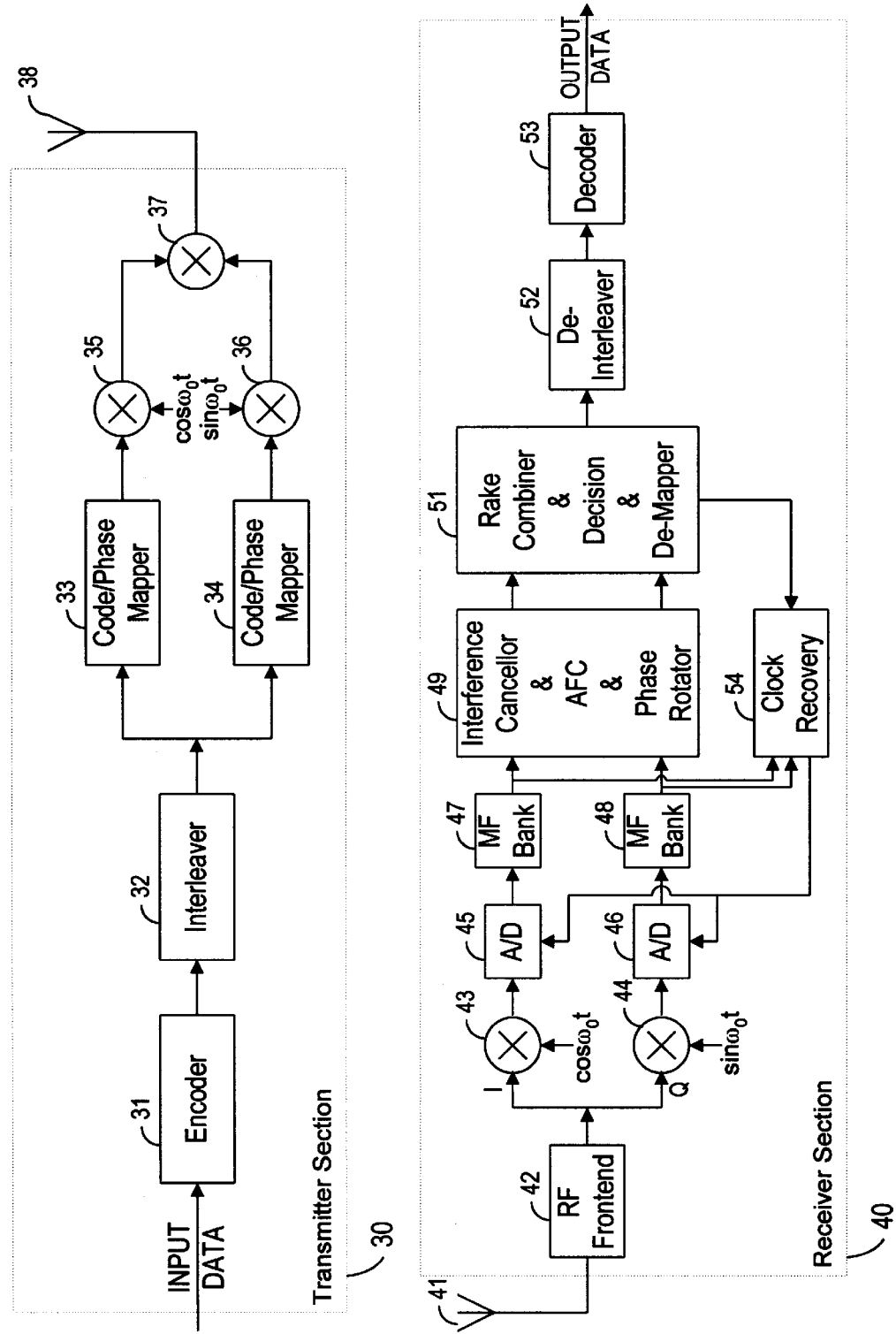
FIG. 3 is a functional block diagram of a spread-spectrum communication system, including a transmitter and a receiver, wherein the receiver may implement the matrix-based matched filter processing in accord with the invention.

To appreciate the application of the invention to spread-spectrum communication, it may be helpful first to place the invention in context, that is to say, to briefly consider an example of a spread-spectrum communication system such as shown in FIG. 3. The illustrated system includes a transmitter 30 communicating with a receiver 40 via an air-link.

The transmitter 30 essentially includes the elements 31–38 shown in the drawing. In the transmitter 30, an encoder 31 receives input information data, for example at 28 Mbps. The encoder 31 performs error correction encoding, for example by application of a rate-½ convolutional code. The resultant encoded data at 56 Mbps is applied to an interleaver 32. At the output of the interleaver 32, the data stream is divided into a number of sub-channel data streams, by a demultiplexer (not shown). In this example, the data stream is split into two branches, one for an in-phase (I) channel and one for the quadrature (Q) channel.

Each sub-channel data sequence goes to an input of one of two code mapper circuits 33, 34. Each code mapper maps bits of input data to a distinct one of the available code-spreading sequences. The mappers 33, 34 may also map certain bits of input data to adjust the phase of the selected code-spreading sequences, but for purposes of discussion here, it is assumed that the mappers perform only the code map function. A modulator 35 receives the code-spread output of the I-channel mapper 33. The modulator 35 multiplies the direct sequence spread spectrum by an RF oscillator signal $\cos(\omega_o t)$ or carrier wave. Similarly, a modulator 36 receives the code-spread output of the Q-channel mapper 34. The modulator 36 multiplies the direct sequence spread spectrum by an RF oscillator signal $\sin(\omega_o t)$. The two resultant modulated signals have the same frequency ($\omega_o t$) but have a 90° phase difference. A summer 37 combines the two modulated RF signals from the modulators 35 and 36, and the combined signal is transmitted over the channel from the transmit antenna 38.

The receiver 40 essentially comprises the elements 41–53. The receiver 40 includes an antenna 41 for receiving the spread-spectrum signal transmitted over the air-link. An RF frontend system 42 provides low noise amplification and automatic gain control (AGC) processing of the analog signal from the antenna 41. The RF frontend system 42 supplies the channel signal to two translating devices 43 and 44. One or more local oscillators generate proper carrier-frequency signals and supply a $\cos(\omega_o t)$ signal to the device 43 and supply a $\sin(\omega_o t)$ signal to the device 44. The translating device 43 multiplies the amplified over-the-air channel signal by the $\cos(\omega_o t)$ signal; and the translating device 44 multiplies the amplified over-the-air channel signal by the sin($\omega_o$t) signal. The translating devices 43 and 44 translate the received multi-channel spread-spectrum signal from the carrier frequency to a processing frequency.

The translating device 43 supplies the spread-spectrum signal at the processing frequency to an analog to digital (A/D) converter 45. Similarly, the translating device 44 supplies the spread-spectrum signal at the processing frequency to an analog to digital (A/D) converter 46. Each of the digital output signals is applied to a matched filter (MF) bank 47 or 48. Each matched filter bank 47, 48 utilizes two quadrant sub-matrices of the matrix of potential spreading codes as reference signals, in this case to recognize the sixteen spreading codes, and correlate the signal on its input to identify the most likely match (largest correlation value). In this manner, each MF filter bank 47, 48 selects the most probably transmitted code sequence for the respective channel.

The signals from the MF banks 47 and 48 are supplied in parallel to a processor 49, which performs interference cancellation, AFC and phase rotation, and the outputs thereof are processed through a rake combiner and decision/demapper circuit 51, to recover and remap the chip sequence signals to the original data values. The data values for the I and Q channels also are multiplexed together to form a data stream at 56 Mbps. This detected data stream is applied to a deinterleaver 52. The deinterleaver 52 reverses the interleaving performed by element 32 at the transmitter. A decoder 53 performs forward error correction (e.g. Viterbi decoding) on the stream output from the deinterleaver 52, to correct errors caused by the communication over the air-link and thus recover the original input data stream (at 28 Mbps).

The illustrated receiver 40 also includes a clock recovery circuit 54, for controlling certain timing operations of the receiver 40, particularly the A/D conversions.

The present invention provides an improvement in the processing of the code recognition in each of the matched filter banks 47, 48 shown in the receiver 40 of FIG. 3. In the above-discussed example of FIG. 3, for simplicity, there was essentially one transmitter sending to one receiver. The actual application of the invention may involve multi-casting to multiple receivers. A preferred network, however, would include a number of cell-site base stations connected to a broadband packet network (not shown).

Each base station would include a transmitter and a receiver utilizing cell-site specific cover codes. A number of mobile stations would communicate with each base station. Within each cell, the mobile stations would access the air-link in a time division manner. In a similar fashion, the cell site base station would transmit to each mobile station on a time division basis. In any two-way communication network, all stations would include a transmitter and a receiver. For example, both the base stations and the mobile stations in the cellular network would include a transmitter 30 and a receiver 40, such as disclosed with regard to FIG. 3. In both directions, the receiver would utilize one or more matched filters implemented in accord with the present invention.

Those skilled in the art will recognize that the spread-spectrum communication system of FIG. 3 is but one example of a spread-spectrum system that may utilize the matrix processing in accord with the invention. For example, the inventive processing is similarly applicable to code recognition in CDMA cellular receivers, in wideband CDMA receivers, etc.

To understand the invention, consider now the code processing in somewhat more detail. The present invention provides a digital matched filter bank specifically adapted for processing of an orthogonal signal set. Any given signal structure consists of a matrix of signals in the following format, where N=number of bits in the chip-code sequence. N also is the number of rows and the number columns in the matrix:

$$\begin{bmatrix} s_{0,0} & s_{0,1} & \cdots & s_{0,N-1} \\ s_{1,0} & s_{1,1} & \cdots & s_{1,N-1} \\ \vdots & \vdots & & \vdots \\ s_{N-1,0} & s_{N-1,1} & \cdots & s_{N-1,N-1} \end{bmatrix} \quad (1)$$

Any spread-spectrum communication system utilizes a specific number of known spreading codes. Matched filter processing utilizes the known possible codes as reference signals. The possible codes therefore can be expressed in a matrix fashion as shown above, where each line of the matrix represents one of the possible spreading code sequences. The present invention utilizes matrix processing with particular advantages derived from the assumption that the possible spreading code sequences have desired relationships among them.

Two codes are orthogonal for purposes of the inventive processing if the following conditions are met:

$$\sum_{k=1}^{N-1} S1(k) \cdot S2(k) = 0 \quad (2)$$

$$\sum_{k=1}^{N-1} S1(k) \cdot S1(k) = N$$

$$\sum_{k=1}^{N-1} S2(k) \cdot S2(k) = N$$

Essentially, this means that the sum of the multiples of the orthogonal codes with each other is minimum (0), whereas the sum of the multiples of any code by itself (e.g. a matching reference) will be a maximum (N). Walsh codes, for example, are sufficiently orthogonal to meet these requirements without matrix manipulation.

Assume that the matrix of signals can be arranged in the following format:

$$M_N = \begin{bmatrix} M_{N/2}^A & M_{N/2}^B \\ M_{N/2}^A & -M_{N/2}^B \end{bmatrix} = \quad (3)$$

$$\begin{bmatrix} s_{0,0} & \cdots & s_{0,\frac{N}{2}-1} & s_{0,\frac{N}{2}} & \cdots & s_{0,N-1} \\ \vdots & & \vdots & \vdots & & \vdots \\ s_{\frac{N}{2}-1,0} & \cdots & s_{\frac{N}{2}-1,\frac{N}{2}-1} & s_{\frac{N}{2}-1,\frac{N}{2}} & \cdots & s_{\frac{N}{2}-1,N-1} \\ s_{\frac{N}{2},0} & \cdots & s_{\frac{N}{2},\frac{N}{2}-1} & s_{\frac{N}{2},\frac{N}{2}} & \cdots & s_{\frac{N}{2},0N-1} \\ \vdots & & \vdots & \vdots & & \vdots \\ s_{N-1,0} & \cdots & s_{N-1,\frac{N}{2}-1} & s_{N-1,\frac{N}{2}} & \cdots & s_{N-1,N-1} \end{bmatrix}$$

Each row represents one of the reference sequences. These references correspond to or are otherwise related to the spreading codes utilized in the particular spread-spectrum communication system. For purposes of the invention, $M_N$ has a special property: each row of the top two quadrants $$[M_{N/2}^A \, M_{N/2}^B]$$

is orthogonal to the corresponding row of the lower two quadrants $$[M_{N/2}^A \, - M_{N/2}^B].$$

Figure 4:
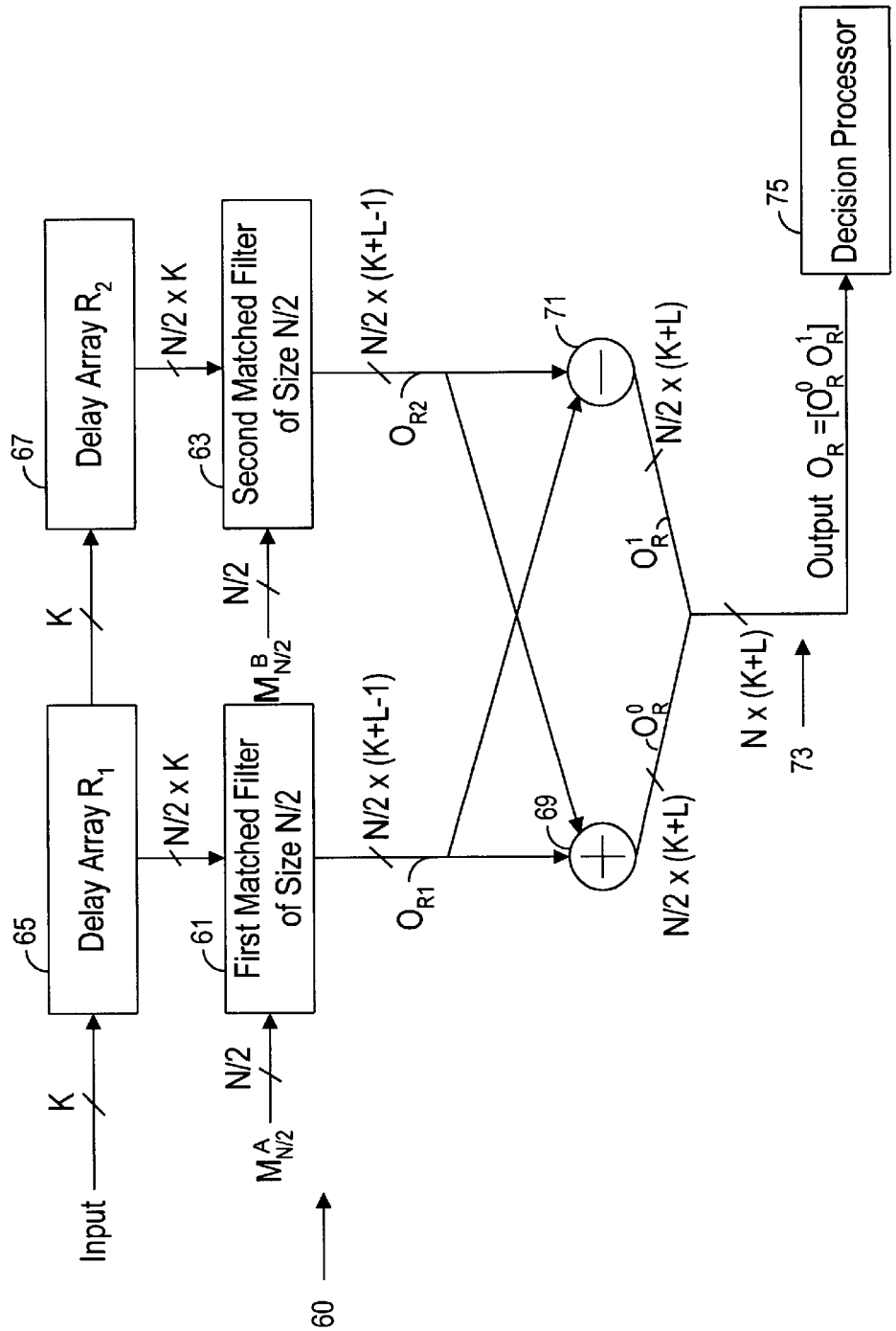
FIG. 4 is a functional block diagram of a matched filter bank, including two quadrant matched filters, for detecting codes in a received spread-spectrum signal in accord with the present invention.

Consequently, the resulting quadrant sub-matrixes $M_{N/2}^A$ and $M_{N/2}^B$ can be used as reference inputs into a matched filter bank 60 as shown in FIG. 4. Each individual sub-matrix $M_{N/2}^A$ or $M_{N/2}^B$ however is used only by one quadrant matrix matched filter 61 or 63, respectively. The use of a reference matrix having at least this predetermined degree of orthogonality among the reference sequences enables the inventive quadrant or sub-matrix processing in a matched filter bank.

Each quadrant-matrix matched filter 61 or 63 is essentially a bank of matched filters comprising only N/2 matched filters for sub-matrix processing. Also, each of the individual matched filters now handles only N/2 bits. Stated another way, each quadrant-matrix matched filter 61 or 63 includes only half as many filters, and each actual individual matched filter processes only half as many bits. Since there are two quadrant-matrix matched filters, there are still as many filters overall, but the smaller number of bits each filter must process enables a substantial savings in terms of the number of computations and thus the amount of hardware.

The input signal also can be considered as a code signal array, albeit in the form of a single line or sequence of sample values (linear array). The input data stream, typically from one of the A/D converters, is sequentially input through a pair of delay arrays 65 and 67. The delay arrays 65 and 67 supply appropriate halves of the input signal matrix to the quadrant-matrix matched filters 61 and 63.

Each bank of matched filters forming one of the quadrant-matrix matched filters 61, 63 processes one section of the input signal array and compares the respective input signal to one quadrant of the possible code matrix. As a result, each quadrant-matrix matched filters 61 or 63 outputs a sub-matrix of correlation signals. In the simplest case, where the reference codes and spreading codes match and have the form of (3) discussed above, the matched filter bank includes a matrix adder 69 and a circuit 71 for performing a matrix subtraction on the signals from the quadrant-matrix matched filters 61 and 63. The two outputs of the matrix adder 69 and the matrix subtraction circuit 71 together at output 73 represent a matrix of code correlation signals for further processing to determine the actual codes received. The output matrix $O_R$ is supplied to a further processor 75, such as the downstream elements shown in FIG. 3. Of particular note, a function of the processor 75 is a decision, to identify a code from the received signal based on recognition of the code of the reference matrix for which the matched filter bank produced the highest correlation value in the output matrix $O_R$.

In operation, when a signal R of the given signal structure is received, K-bit samples r are taken at fixed intervals from k to k−(N−1), where k is the sampling index and N is the number of samples taken, by the A/D converter. By dividing the samples into two arrays, each array consists of N/2 samples. The received signal R can be represented by the matrix:

$$R = [r_k \, r_{k-1} \, \ldots \, r_{k-(N/2-1)} \, r_{k-(N/2)} \, r_{k-(N/2+1)} \, \ldots \, r_{k-(N-1)}] = [R_1 R_2] \quad (4)$$

where $R_1$=first array of samples supplied to bank 61

$R_2$=second array of samples supplied to bank 63

These samples in the two half matrices will be matched with the two predefined quadrant matrixes $M_{N/2}^A$ and $M_{N/2}^B$ of reference codes. One matched filter produces a quadrant output matrix of $R_1 \times M_{N/2}^A$. The other matched filter produces a quadrant output matrix of $R_2 \times M_{N/2}^B$.

The output of the overall matched filter bank is:

$$O_R \equiv \begin{bmatrix} O_R^0 \\ O_R^1 \end{bmatrix} = R \cdot M_N^T = [R_1 R_2] \begin{bmatrix} M_{N/2}^A & M_{N/2}^B \\ M_{N/2}^A & -M_{N/2}^B \end{bmatrix} \quad (5)$$

which becomes:

$$O_R \equiv \begin{bmatrix} R_1 \cdot (M_{N/2}^A)^T + R_2 \cdot (M_{N/2}^B)^T \\ R_1 \cdot (M_{N/2}^A)^T - R_2 \cdot (M_{N/2}^B)^T \end{bmatrix} = \begin{bmatrix} O_{R_1} + O_{R_2} \\ O_{R_1} - O_{R_2} \end{bmatrix} \quad (6)$$

where $O_{R1}$ is the output of the first matched filter bank 61 corresponding to the signal samples array $R_1$;

$O_{R2}$ is the output of the second matched filter bank 63 corresponding to signal samples array $R_2$;

$O_R^0$ is the sum of the outputs of the first and second matched filters output by the adder 69, i.e., $O_{R1}+O_{R2}$; and $O_R^0$ is the difference of the outputs of the first and second matched filters output by the subtraction circuit 71, i.e., $O_{R1}-O_{R2}$.

As shown by the matrix equations (5) and (6), it is possible to derive the full matrix of correlation values $O_R$ of the input to the entire matrix of reference codes, from the matrix matching of the $R_1$ and $R_2$ to the quadrant sub-matrixes $M_{N/2}^A$ and $M_{N/2}^B$ for the reference codes. In the system of FIG. 3, the samples of the first array $R_1$ are matched to the first quadrant sub-matrix $M_{N/2}^A$, in the quadrant-matrix matched filter 61. At the same time, the samples of the second array $R_2$ are matched to the second quadrant sub-matrix $M_{N/2}^B$, in the second quadrant-matrix matched filter 63. The matching operations generate outputs $O_{R1}$ and $O_{R2}$ respectively. By adding $O_{R1}$ and $O_{R2}$, the result $O_R^0$ is generated. By subtracting $O^{R2}$ from $O_{R1}$, the result $O_R^1$ is generated.

Figure 1:
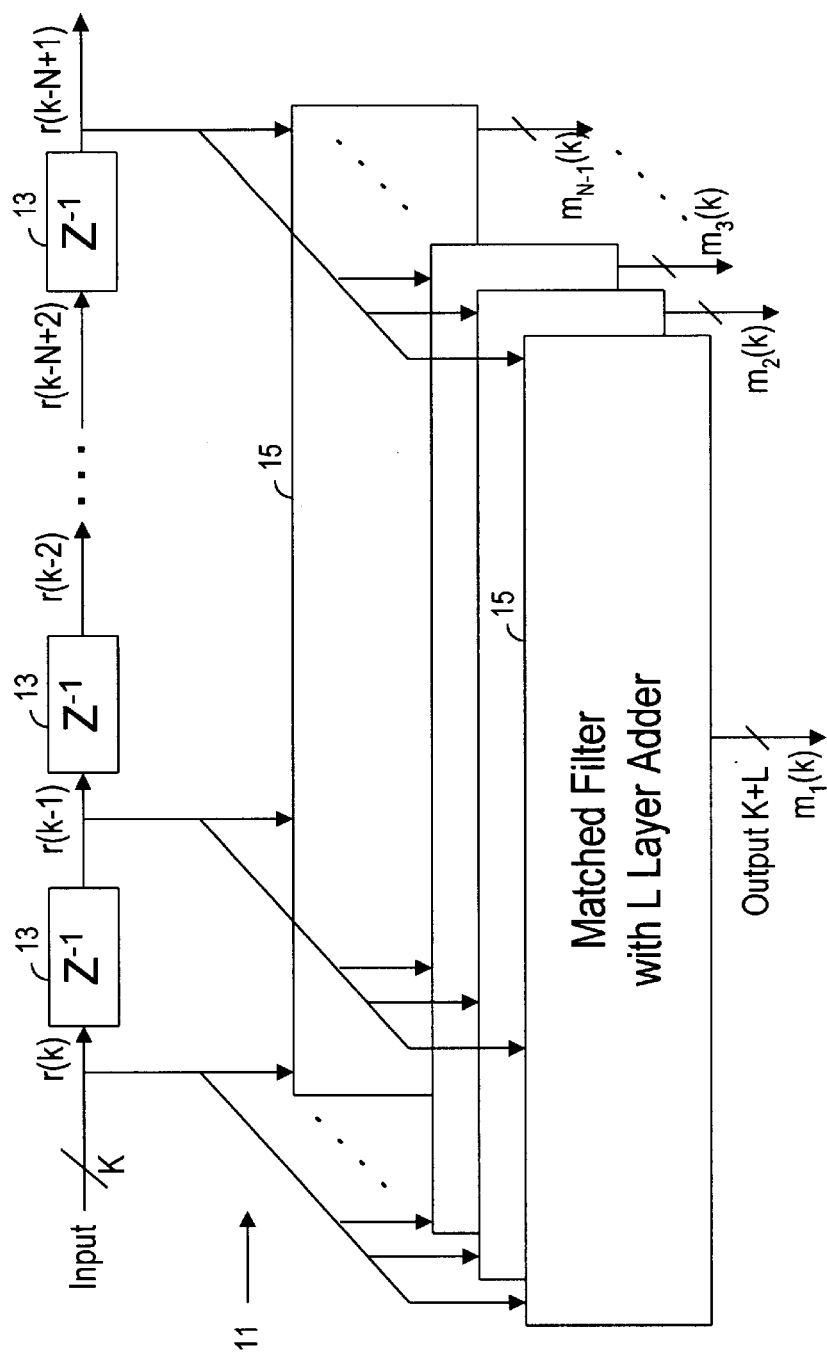
FIG. 1 is a block diagram of a prior art bank of matched filters for detecting codes in a received spread-spectrum signal.
Figure 2:
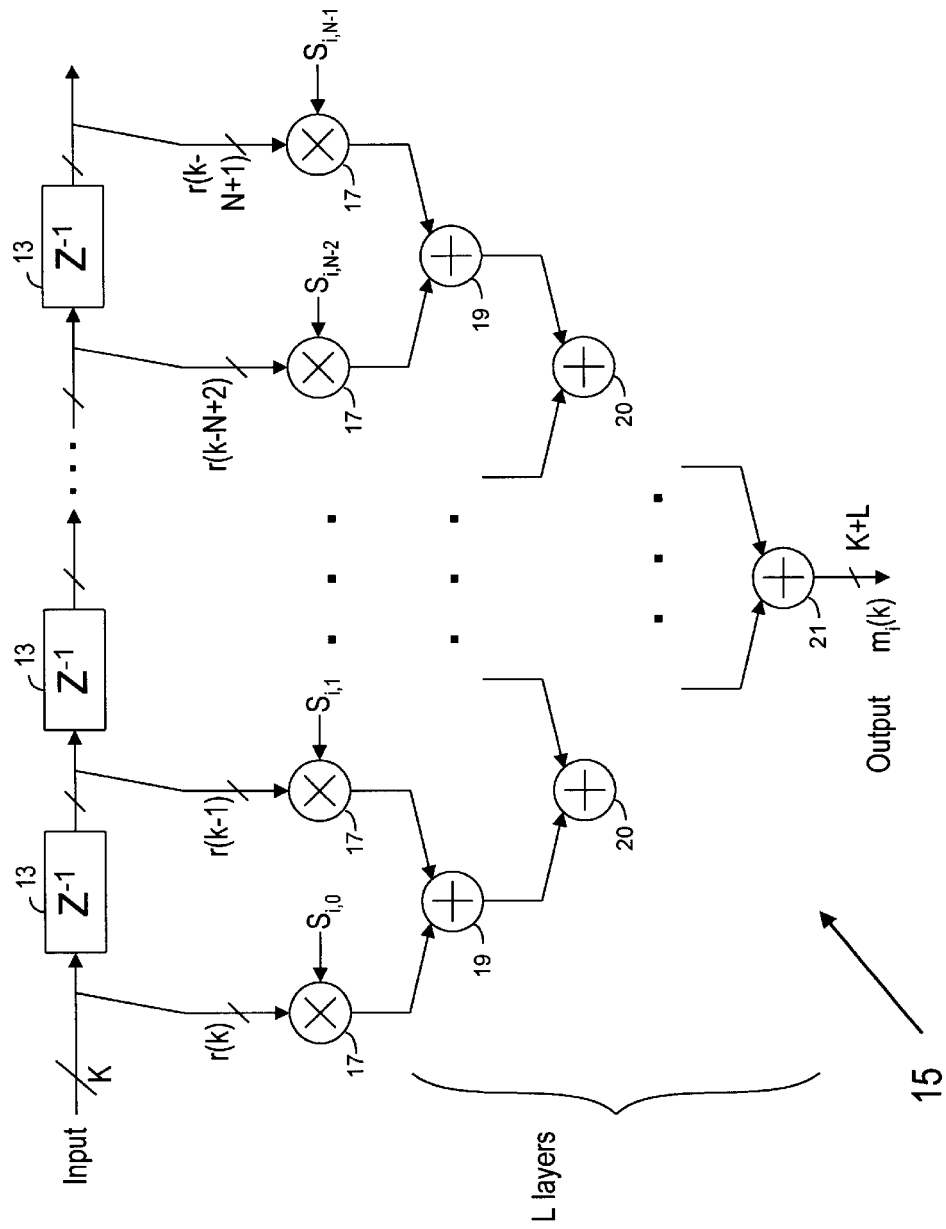
FIG. 2 is a block diagram useful in explaining the operation of one of the matched filters of the bank of filters shown in FIG. 1.

The overall output of the matched filter bank $O_R$ is a matrix or vector of correlation values indicating the level of correlation of the input to each of the rows of the reference matrix, that is to say to each of the known spreading code sequences used in the spread-spectrum communication system. The overall output of the matched filter bank is $O_R$ actually is the same overall output as provided by a standard bank of matched filters as discussed above relative to FIGS. 1 and 2. The subsequent processing at 75 preferably involves a decision to identify the highest correlation value and thus the code received during a given processing interval. In a system having multiple simultaneous users sending different ones of the codes, the processor could execute an algorithm to determine which one or more of the codes were contained in the received signal in any given symbol interval.

FIGS. 5A, 5B, 6A and 6B are functional block diagrams of four of the matched filters in the two quadrant-matrix matched filter 61 and 63, shown in FIG. 3.

Figure 5A:
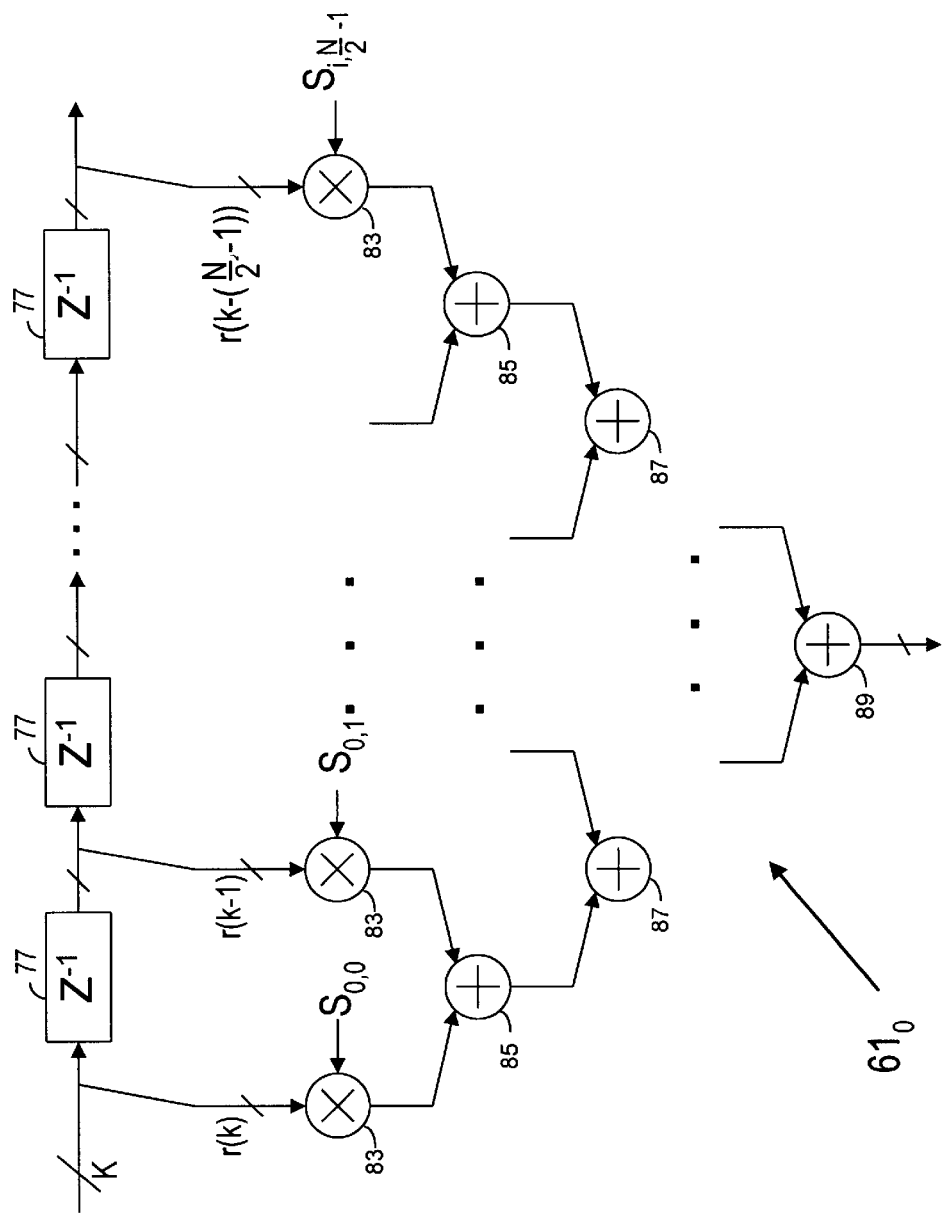
FIGS. 5A and 5B are block diagrams of two of the actual filters in a first one of the quadrant matrix matched filters of FIG. 4.

FIG. 5A illustrates the matched filter $61_0$, for processing of the first row of the $M_{N/2}{}^A$ quadrant matrix. The delays 77 in FIGS. 5A (and 5B) form the delay array for $R_1$. The taps from the line of delays 77 provide samples of the input signal as follows:

$$R1=[r(k)\ r(k-1)\ \ldots\ r(k-(N/2-1))]$$

These input samples are supplied to N/2 multipliers 83. The first of these multipliers receives the input sample r(k) and the reference signal $S_{0,0}$. The second multiplier receives the input sample r(k−1) and the reference signal $S_{0,1}$, and so on, until the N/2 multiplier, which receives the input sample r(k−(N/2−1)) and the reference signal $S_{0,N/2-1}$. Assuming again that a code bit may have a value of 1 or −1 (corresponding to 0, 1 in digital notation), each multiplication operation will have an output value of 1 if the input value and the reference value are the same (1x1 or −1x−1). Each multiplication operation will have an output value of −1 if the input value and the reference value are different (1x−1 or −1x1). The outputs of the multipliers 83 are processed through a tree of adders 85, 87 and 89, to determine an overall correlation to the complete reference code from the first line of the first quadrant sub-matrix $M_{N/2}{}^A$. It should be noted that because the filter processes only half as many samples (N/2), the number of layers in the adder tree is much smaller than in the prior art.

Figure 5B:
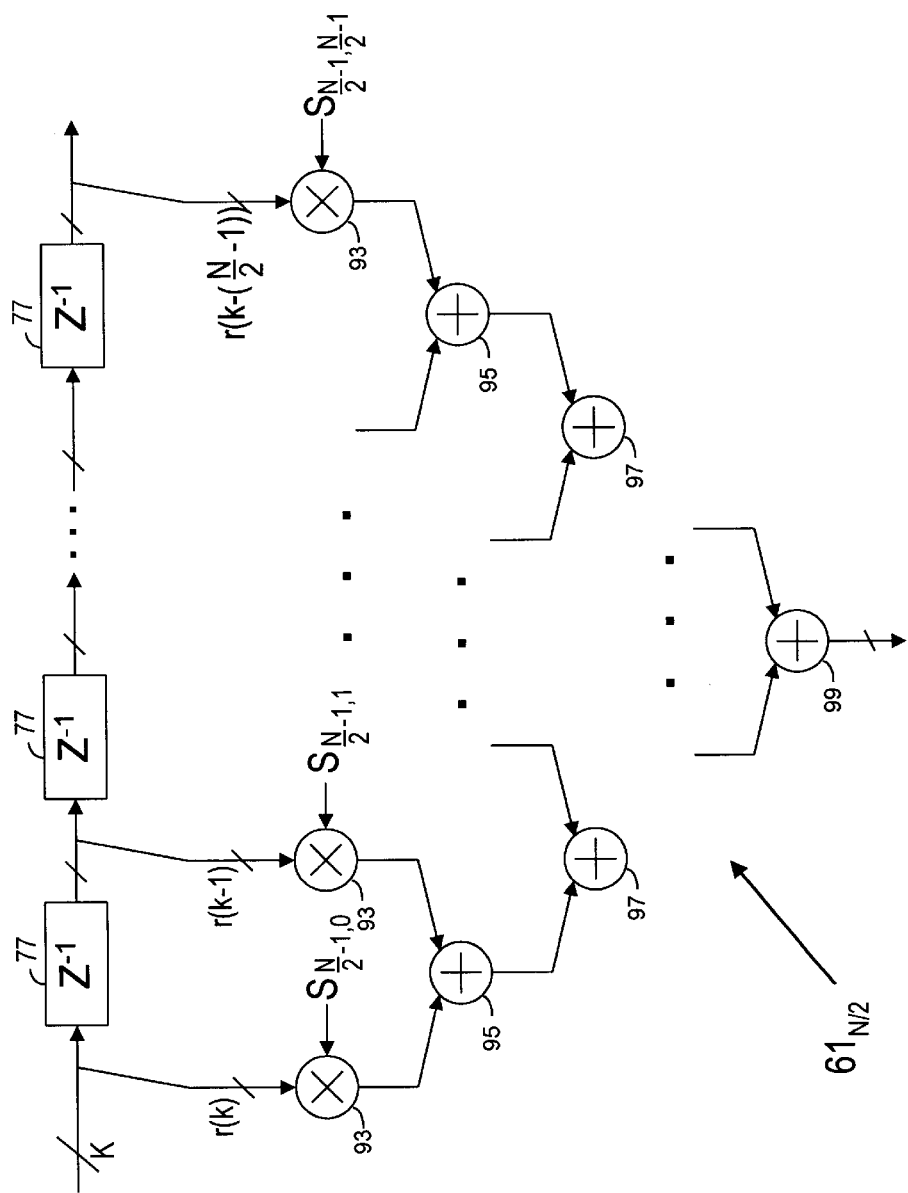

The first quadrant-matrix matched filter 61 would include similar filters for the other rows of the first reference quadrant, including a last filter $61_{N/2}$, as shown in FIG. 5B. The drawing again shows the delays 77 of the array supplying samples of the input signal $$R1=[r(k)\ r(k-1)\ \ldots\ r(k-(N/2-1))]$$

to a series of N/2 multipliers, in this case to the multipliers 93. The first of these multipliers receives the input sample r(k) and the reference signal $S_{N/2-1,0}$. The second multiplier receives the input sample r(k−1) and the reference signal $S_{N/2-1,1}$, and so on, until the N/2 multiplier, which receives the input sample r(k−(N/2−1)) and the reference signal $S_{N/2-1,N/2-1}$. Again, each multiplication operation will have an output value of 1 if the input value and the reference value match or an output value of −1 if the input value and the reference value differ. The outputs of the multipliers 93 are processed through a tree of adders 95, 97 and 99, to determine an overall correlation to the complete reference code from the N/2 (last) line of the first quadrant sub-matrix $M_{N/2}{}^A$.

Figure 6A:
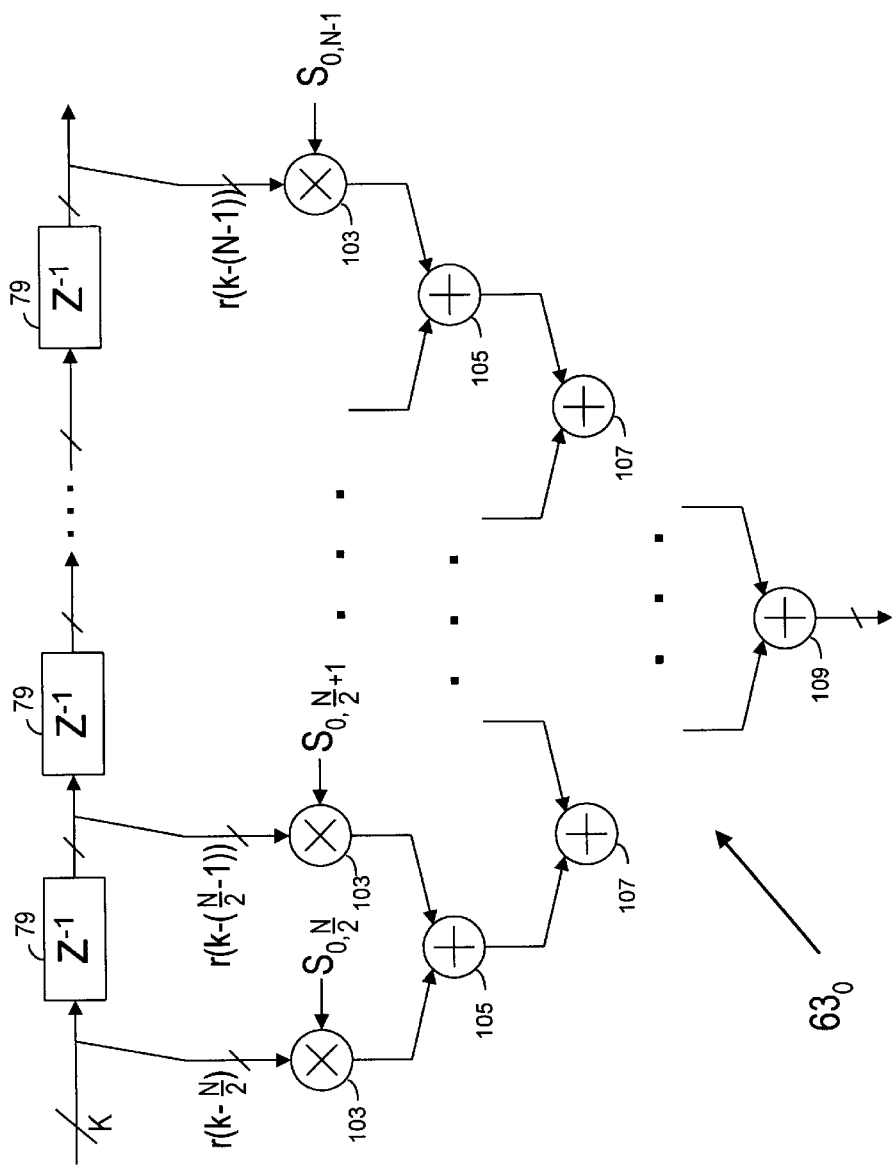
FIGS. 6A and 6B are block diagrams of two of the actual filters in the other quadrant matrix matched filter of FIG. 4.

FIG. 6A illustrates the matched filter $63_0$, for processing of the first row of the $M_{N/2}{}^B$ quadrant matrix. The delays 79 in FIGS. 6A (and 6B) form the delay array for $R_2$. The taps from the line of delays 79 provide samples of the input signal as follows:

$$R2=[r(k-N/2)\ r(k-(N/2+1))\ \ldots\ r(k-(N-1))].$$

These input samples are supplied to N/2 multipliers 103. The first of these multipliers receives the input sample r(k−N/2) and the reference signal $S_{0,N/2}$. The second multiplier receives the input sample (k−(N/2+1)) and the reference signal $S_{0,N/2+1}$, and so on, until the N/2 multiplier, which receives the input sample r(k−(N−1)) and the reference signal $S_{0,N-1}$. Each multiplication operation will have an output value of 1 if the input value and the reference value are the same, or an output value of −1 if the input value and the reference value are different. The outputs of the multipliers 103 are processed through a tree of adders 105, 107, 109, to determine an overall correlation to the complete reference code from the first line of the second quadrant sub-matrix $M_{N/2}{}^B$.

Figure 6B:
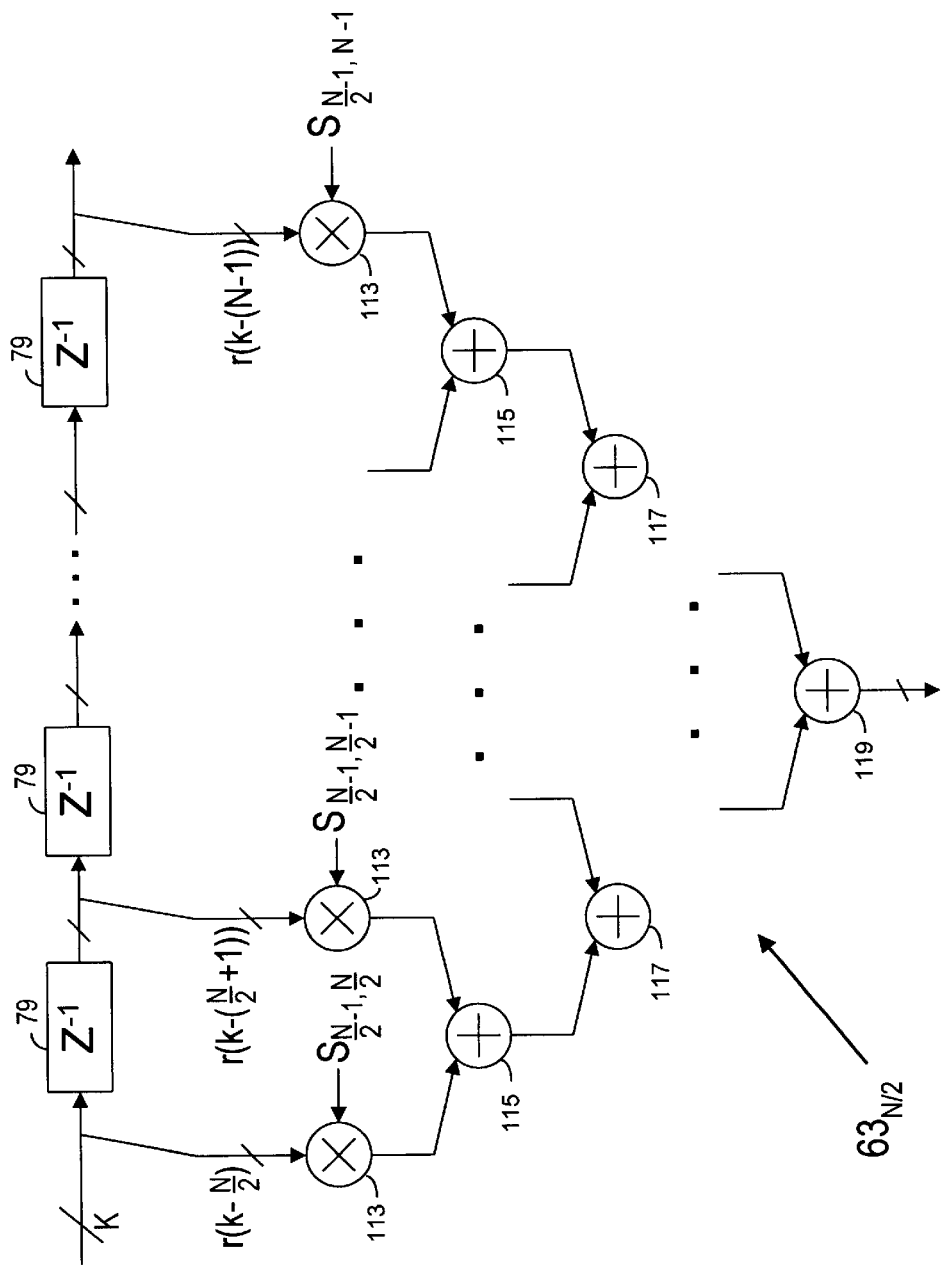

The second quadrant-matrix matched filter 63 includes similar filters for the other rows of the second reference quadrant, including a last filter $63_{N/2}$, as shown in FIG. 6B. The drawing again shows the delays 79 of the array supplying samples of the input signal $$R2=[r(k-N/2)\ r(k-(N/2+1))\ \ldots\ r(k-(N-1))],$$

to a series of N/2 multipliers, in this case to the multipliers 113. The first of these multipliers receives the input sample r(k−N/2) and the reference signal $S_{N/2-1,N/2}$. The second multiplier receives the input sample (k−(N/2+1)) and the reference signal $S_{N/2-1,N/2+1}$, and so on, until the N/2 multiplier, which receives the input sample r(k−(N−1)) and the reference signal $S_{N/2-1,N-1}$. Each multiplication operation will have an output value of 1 or −1 depending on whether or not there is a match. The outputs of the multipliers 113 are processed through a tree of adders 115, 117 and 119, to determine an overall correlation to the complete reference code from the N/2 (last) line of the second quadrant sub-matrix $M_{N/2}{}^B$.

If the actual arrangement of the matrix of codes used in a particular network does not satisfy the above desired criteria (3), the desired arrangement to the format $M_N$ can be achieved in many ways. For most orthogonal signal sets that do not comply with the desired arrangement, it is possible to simply rearrange them into the above-mentioned form by matrix manipulation. If the matrix manipulation only involves any one or combination of (a) shifting the bit position (the column) of both the reference signals and input signal in the set; (b) shifting the order (the row) of the reference signals in the set; (c) inverting the signs of the reference signals in the set; (d) inverting the signs of all the bits of a column of reference signals and an input signal, then little or no extra hardware will be needed. Of course, to get the original matched filter outputs, some post manipulations may be necessary.

Various modification are possible. For example, the number of rows need not necessarily equal the number of columns. Those skilled in the art will recognize that other arithmetic operations of the rows or columns in the matrix may be used to convert a matrix to a form that satisfies the criteria in accord with the present invention.

While most such rearrangements are very simple, there are times when a complex operation is required. For example, suppose there is a matrix $M_N'$ that is not in the form of $M_N$. There are two matrixes A and B, such that $M_N' = A*M_N*B$. Matrix A is the product of row transformation matrix, and matrix B is the production of column transformation matrix. Since $$R*M_N'^T = R*(A*M_N*B)^T = R*B^T*M_N^T*A^T, \qquad (6)$$

the matched filter bank can be built with three sections:

$$(1) R*B^T, (2)(R*B^T)*M_N^T, \text{ and } (3)(R*B^T*M_N^T)*A^T. \qquad (7)$$

The savings of the hardware depend on the complexity of the hardware requirement of these three sections. As an example, these techniques may be used to convert almost any arbitrary orthogonal matrix of 64 codes to a corresponding matrix of Walsh 64 codes, which satisfies the above discussed requirements for orthogonality of rows in the upper quadrants to corresponding rows in the lower quadrants.

Essentially, if the codes used in the spread-spectrum system do not satisfy the above-noted requirements, it is possible to determine from the known codes used in the system how to convert the codes to the desired format as (3). It is then possible to apply the necessary code conversion to the matrix of the input signal and/or the reference matrix.

Changes to the input matrix and reference matrix, for example, may be made by changing the connections and/or adding inverters between the delay line taps and the multipliers in the matched filters to shift columns and/or change signs. The quadrant matched filters then compare the converted input matrix to the quadrants of the desired reference code matrix, as in the implementation discussed above relative to FIGS. 3 to 6B.

Figure 7:
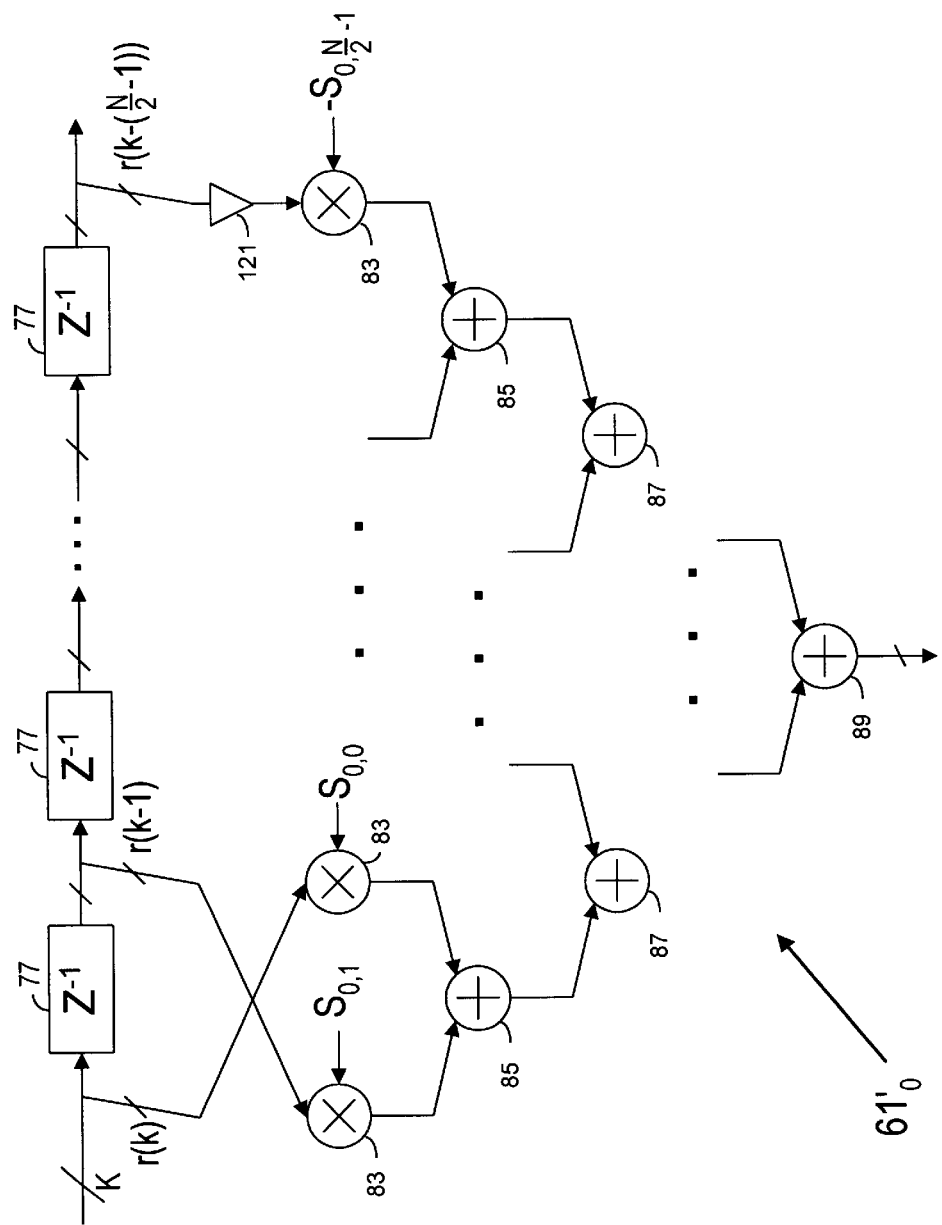
FIG. 7 is a block diagram of a modified matched filter useful in explaining matrix manipulation to compensate for a code set that does have the desired orthogonal property.

Consider the matched filter of FIG. 7 as a simple example, useful in explaining this matrix conversion. This drawing shows a modified form $61'_0$ of the first filter of the first quadrant matrix matched filter. The filter $61'_0$ is substantially the same as the filter $61_0$ of FIG. 5A, and like numerals indicate similar elements thereof. The circuitry shown in FIG. 7, however, includes two modifications that may be used to compensate for a non-orthogonal signal set not in the form of (3). Again the delays 77 supply the signal samples to the multipliers 83. In this example, r(k) and $S_{0,0}$ switch the positions with r(k−1) and $S_{0,1}$, correspondingly. The interconnections of the first two multipliers to the input and the delay achieve a switch in the positions of the first two input samples in the half-matrix. To illustrate another change, the last input sample r(k−(N/2−1)) is supplied through an inverter 121, so as to change the sign thereof before multiplication by the reference signal $S_{0,N/2-1}$. The outputs of the multipliers 83 are again processed through a tree of adders 85, 87 and 89, to determine an overall correlation to the complete reference code from the first line of the first quadrant sub-matrix $M_{N/2}^A$. This matching, however, utilizes the modified form of the half-matrix of input signals. The modified reference sequence $[S_{0,1}\ S_{0,0}\ \ldots\ S_{0,N/2-2}\ -S_{0,N/2-1}]$ will be identical to the modified reference sequence $[S_{N/3-1}\ S_{N/2,0}\ \ldots\ S_{N/2,N/2-2}\ -S_{N/2,N/2-1}]$. These modifications plus possible row position changes could make the modified matrix have the form of (3), and each quadrant of the modified matrix has the form of (3).

The correlation values output by the quadrant-matrix matched filters then indicate the level of correlation of the converted input signal to the reference codes of the orthogonal matrix (3). The subsequent processing circuitry would then perform any mapping necessary to convert the identification of a match of a reference code to an identification of the appropriate code used in the spread-spectrum communication system.

To illustrate the hardware savings accomplished by this invention, consider the following example. Suppose the input has K bits, and the orthogonal signal set is of 64 Walsh codes with any cover code of a length of 64. As discussed in the Background, the conventional approach would utilize 64 matched filters, which require 64(63K+57)=4032K+3,648 bits of addition operation.

Now assume an implementation such as discussed above relative to FIGS. 3 to 6B. Under the present invention, the matched filters have a combined total of:

| | | |
|---|---|---|
| 32 × 2: | K | bit adders |
| 16 × 4: | K + 1 | bit adders |
| 8 × 8: | K + 2 | bit adders |
| 4 × 16: | K + 3 | bit adders |

-continued

| | | |
|---|---|---|
| 2 × 32: | K + 4 | bit adders |
| 1 × 64: | K + 5 | bit adders |

Together, there are 384K+960 of bit addition operations, in the exemplary implementation in accord with the invention. The hardware savings are obvious, especially as the number of bits in the input increases. The current invention provides a more than 70% savings over conventional method.

When K=4, (4,032(4)+3,648)/(384(4)+960)=7.92

When K=8, (4,032(8)+3,648)/(384(8)+960)=8.90

In the example where K=4, the conventional approach would require 7.92 times as much bit adder hardware as required for processing in accord with the present invention. Similarly, in the example where K=8, the conventional approach would require 8.90 times as much bit adder hardware as required for processing in accord with the present invention.

Those skilled in the art will recognize that the inventive processing technique may be subject to a variety of modifications, within the scope of the invention. For example, the algorithm can be further broken down if $M_{N/2}$ also is an orthogonal set. Stated another way, within each quadrant, the codes are orthogonal, and the codes therein may be processed in the manner discussed above using only two of the four sub-quadrants.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the invention.

What is claimed is:

1. A matched filter bank for processing spreading codes in a signal received from a spread-spectrum communication system, comprising:

a first quadrant matrix matched filter for receiving a first half-matrix of an input bit stream derived from the received spread-spectrum signal and deriving a first quarter matrix of correlation values representing correlation of the first half-matrix of the input bit stream to a first one of four quadrants of a matrix of rows formed from a plurality of reference codes related to possible spreading codes utilized in the spread-spectrum communication system, the rows of the matrix of reference codes having a predetermined degree of orthogonal relationship there between;

a second quadrant matrix matched filter for receiving a second half-matrix of the input bit stream and deriving a second quarter matrix of correlation values representing correlation of the second half-matrix of the input bit stream to a second quadrant of four quadrants of the matrix of reference codes; and a matrix computation system for manipulating the first quarter matrix of correlation values and the second quarter matrix of correlation values to obtain a full matrix of correlation values representing correlation of the input bit stream to the entire matrix of reference codes.

2. A matched filter bank as in claim 1, wherein the matrix computation system comprises:

a matrix adder for adding the first quarter matrix of correlation values and the second quarter matrix of correlation values; and a matrix subtraction circuit for subtracting the second quarter matrix of correlation values from the first quarter matrix of correlation values.

3. A matched filter bank as in claim 1 wherein each row of an upper pair of quadrants of the matrix of reference codes is orthogonal to a corresponding row of a lower pair of quadrants of the matrix of reference codes.

4. A matched filter bank as in claim 3, wherein:

the possible spreading codes utilized in the spread-spectrum communication system do not exhibit the predetermined degree of orthogonal relationship but the possible spreading codes bear a known matrix relationship to a matrix of codes having the predetermined degree of orthogonal relationship, and the matched filter bank further comprises means for matrix manipulation of the input bit stream or at least one of the quadrants of the matrix of reference codes to effectuate a conversion corresponding to a conversion of a matrix of the possible spreading codes to the matrix of codes having the predetermined degree of orthogonal relationship.

5. A matched filter bank as in claim 3, wherein the matrix of reference codes is an orthogonal matrix of reference codes.

6. A matched filter bank as in claim 1, wherein:

the first quadrant matrix matched filter comprises a plurality of individual matched filters each of which correlates the first half-matrix of the input bit stream to a respective line of the first quadrant of the matrix of reference codes; and the second quadrant matrix matched filter comprises a plurality of individual matched filters each of which correlates the second half-matrix of the input bit stream to a respective line of the second quadrant of the matrix of reference codes.

7. A matched filter bank as in claim 5, wherein each of the individual matched filters of the first and second quadrant matrix matched filters comprises:

an array of multipliers, each multiplier for receiving a sample from a respective half-matrix of the input bit stream and multiplying the received sample by predetermined portion of code of a respective quadrant of the matrix of reference codes; and a bit adder tree for summing outputs of the array of multipliers to obtain a respective correlation value.

8. A receiver for use in a wireless spread-spectrum communication system, comprising:

an analog to digital converter for converting a received spread-spectrum signal to a digital bit stream comprising a matrix of input samples;

a matched filter bank comprising means for: comparing a first half of the input matrix to a first one of four quadrants of a matrix of rows formed from a plurality of reference codes related to possible spreading codes, comparing a second half of the input matrix to a second quadrant of four quadrants of the matrix of reference codes, and computing from results of the half-matrix comparisons a full four-quadrant matrix of correlation values representing correlation of the input matrix to the entire four-quadrant matrix of reference codes, wherein the rows of the matrix of reference codes have predetermined orthogonal relationships; and a processor receiving the full matrix of correlation values, for identifying at least one code contained within the received spread-spectrum signal.

9. A receiver as in claim 8, wherein each row of an upper pair of quadrants of the matrix of reference codes is orthogonal to a corresponding row of a lower pair of quadrants of the matrix of reference codes.

10. A receiver as in claim 9, wherein the matrix of reference codes comprises an orthogonal matrix of code sequences.

11. A receiver as in claim 9, wherein:

the possible spreading codes do not exhibit the predetermined orthogonal relationships but the possible spreading codes bear a known matrix relationship to a matrix of codes exhibiting the predetermined orthogonal relationships, and the spread-spectrum receiver system further comprises means for manipulating the input matrix or at least one of the quadrants of the matrix of reference codes to effectuate a conversion corresponding to a conversion of a matrix of the possible spreading codes to the matrix of codes exhibiting the predetermined orthogonal relationships.

12. A receiver for use in a wireless spread-spectrum communication system, comprising:

an analog to digital converter for converting a received spread-spectrum signal to a digital bit stream comprising a matrix of input samples;

a matched filter bank comprising:

(a) a first quadrant matrix matched filter for receiving a first half of the input matrix and deriving a first quarter matrix of correlation values representing correlation of the first half of the input matrix to a first one of four quadrants of a matrix of rows formed from a plurality of reference codes related to possible spreading codes utilized in the spread-spectrum communication system;

(b) a second quadrant matrix matched filter for receiving a second half of the input matrix bit stream and deriving a second quarter matrix of correlation values representing correlation of the second half of the input matrix to a second quadrant of four quadrants of the matrix of reference codes; and (c) a matrix computation system for manipulating the first quarter matrix of correlation values and the second quarter matrix of correlation values to obtain a full matrix of correlation values representing correlation of the input matrix to the entire matrix of reference codes; and a processor for receiving the full matrix of correlation values, for identifying a code contained within the received spread-spectrum signal by identifying one of the reference codes corresponding to the highest correlation value in the full matrix of correlation values.

13. A receiver as in claim 12, wherein the matrix of reference codes comprises rows of code sequences having a predetermined set of orthogonal relationships.

14. A receiver as in claim 13, further comprising matrix manipulation means for compensating for a lack of the predetermined set of orthogonal relationships among the possible spreading codes.

15. A method of processing a spreading code sequence in a signal received from a wireless spread-spectrum communication system, comprising:

establishing a matrix from a plurality of reference code sequences, each reference code sequence in the matrix of reference code sequences having a known relationship to one of a plurality of possible spreading code sequences that may be in the signal received from the wireless spread-spectrum communication system, sequences in the matrix of reference code sequences exhibiting known orthogonal relationships;

selecting a first one of four quadrants of the matrix as a first quadrant reference matrix;

selecting a second one of the four quadrants of the matrix as a second quadrant reference matrix;

converting the received signal into a digital bit stream;

processing a predetermined number of samples from the digital bit stream to form a matrix input;

separating the matrix input into a first half matrix and a second half matrix;

matched-filtering the first half matrix and the first quadrant reference matrix to derive a first quarter matrix of correlation values;

matched-filtering the second half matrix and the second quadrant reference matrix to derive a second quarter matrix of correlation values; and processing the first quarter matrix of correlation values and the second quarter matrix of correlation values to obtain a full matrix of correlation values representing correlation of the predetermined number of samples from the digital bit stream to the entire orthogonal matrix of reference code sequences.

16. A method as in claim 15, further comprising compensating for a lack of the predetermined orthogonal relationships among the possible spreading code sequences.

17. A method as in claim 15, wherein the step of processing the first quarter matrix of correlation values and the second quarter matrix of correlation values comprises:

adding the first quarter matrix of correlation values and the second quarter matrix of correlation values;

subtracting the second quarter matrix of correlation values from the first quarter matrix of correlation values; and combining the results of the adding and the subtracting to form the full matrix of correlation values.

18. A method as in claim 15, further comprising identifying one of the reference code sequences corresponding to the highest correlation value in the full matrix of correlation values as a match to a spreading code sequence contained within the input matrix.

19. A method as in claim 15, wherein:

the matrix of reference code sequences takes the form of $$M_N = \begin{bmatrix} M_{N/2}^A & M_{N/2}^B \\ M_{N/2}^A & -M_{N/2}^B \end{bmatrix} =$$

$$\begin{bmatrix} s_{0,0} & \cdots & s_{0,\frac{N}{2}-1} & s_{0,\frac{N}{2}} & \cdots & s_{0,N-1} \\ \vdots & & \vdots & \vdots & & \vdots \\ s_{\frac{N}{2}-1,0} & \cdots & s_{\frac{N}{2}-1,\frac{N}{2}-1} & s_{\frac{N}{2}-1,\frac{N}{2}} & \cdots & s_{\frac{N}{2}-1,N-1} \\ s_{\frac{N}{2},0} & \cdots & s_{\frac{N}{2},\frac{N}{2}-1} & s_{\frac{N}{2},\frac{N}{2}} & \cdots & s_{\frac{N}{2},0N-1} \\ \vdots & & \vdots & \vdots & & \vdots \\ s_{N-1,0} & \cdots & s_{N-1,\frac{N}{2}-1} & s_{N-1,\frac{N}{2}} & \cdots & s_{N-1,N-1} \end{bmatrix};$$

N is the predetermined number of samples processed from the digital bit stream to form the matrix input;

each row of the top two quadrants $$[M_{N/2}^A M_{N/2}^B]$$

is orthogonal to each corresponding row of the lower two quadrants $$[M_{N/2}^A - M_{N/2}^B];$$

the first quarter matrix of reference code sequences comprises $M_{N/2}^A$; and the second quarter matrix of reference code sequences comprises $M_{N/2}^B$.

20. A method as in claim 19, wherein:

the input matrix has a format of $R=[R_1 R_2]$, wherein $R_1$ is the first half matrix and $R_2$ is the second half matrix;

the step of matched-filtering the first half matrix and the first quadrant reference matrix derives a first quarter matrix of correlation values represented by $R_1 \times M_{N/2}^A$;

the step of matched-filtering the second half matrix and the second quadrant reference matrix derives a second quarter matrix of correlation values represented by $R_2 \times M_{N/2}^B$; and the full matrix of correlation values comprises $$O_R \equiv \begin{bmatrix} R_1 \cdot (M_{N/2}^A)^T + R_2 \cdot (M_{N/2}^B)^T \\ R_1 \cdot (M_{N/2}^A)^T - R_2 \cdot (M_{N/2}^B)^T \end{bmatrix}.$$

21. A method of processing a spreading code sequence in a signal received from a wireless spread-spectrum communication system, comprising:

establishing a matrix from a plurality of reference code sequences, each reference code sequence in the matrix having a known relationship to a possible one of a plurality of spreading code sequences that may be in the signal received from the wireless spread-spectrum communication system;

selecting a first sub-section of the matrix of reference code sequences as a first partial reference matrix;

selecting a second sub-section of the matrix of reference code sequences as a second partial reference matrix, wherein the matrix of reference code sequences comprises at least one additional sub-section;

converting the received signal into a digital bit stream;

processing a predetermined number of samples from the digital bit stream to form a matrix input;

separating the matrix input into first and second sub-sections;

matched-filtering the first sub-section of the input matrix and the first partial reference matrix to derive a first sub-matrix of correlation values;

matched-filtering the second sub-section of the input matrix and the second partial reference matrix to derive a second sub-matrix of correlation values; and processing the first sub-matrix of correlation values and the second sub-matrix of correlation values to obtain an additional sub-matrix of correlation values, wherein the first sub-matrix of correlation values, the second sub-matrix of correlation values and the additional sub-matrix of correlation values together form a full matrix of correlation values representing correlation of the predetermined number of samples from the digital bit stream to the entire matrix of reference code sequences.

* * * * *